Sept. 12, 1944.  M. R. CHANDLER ET AL  2,357,875
CONVEYER SYSTEM
Filed April 28, 1942
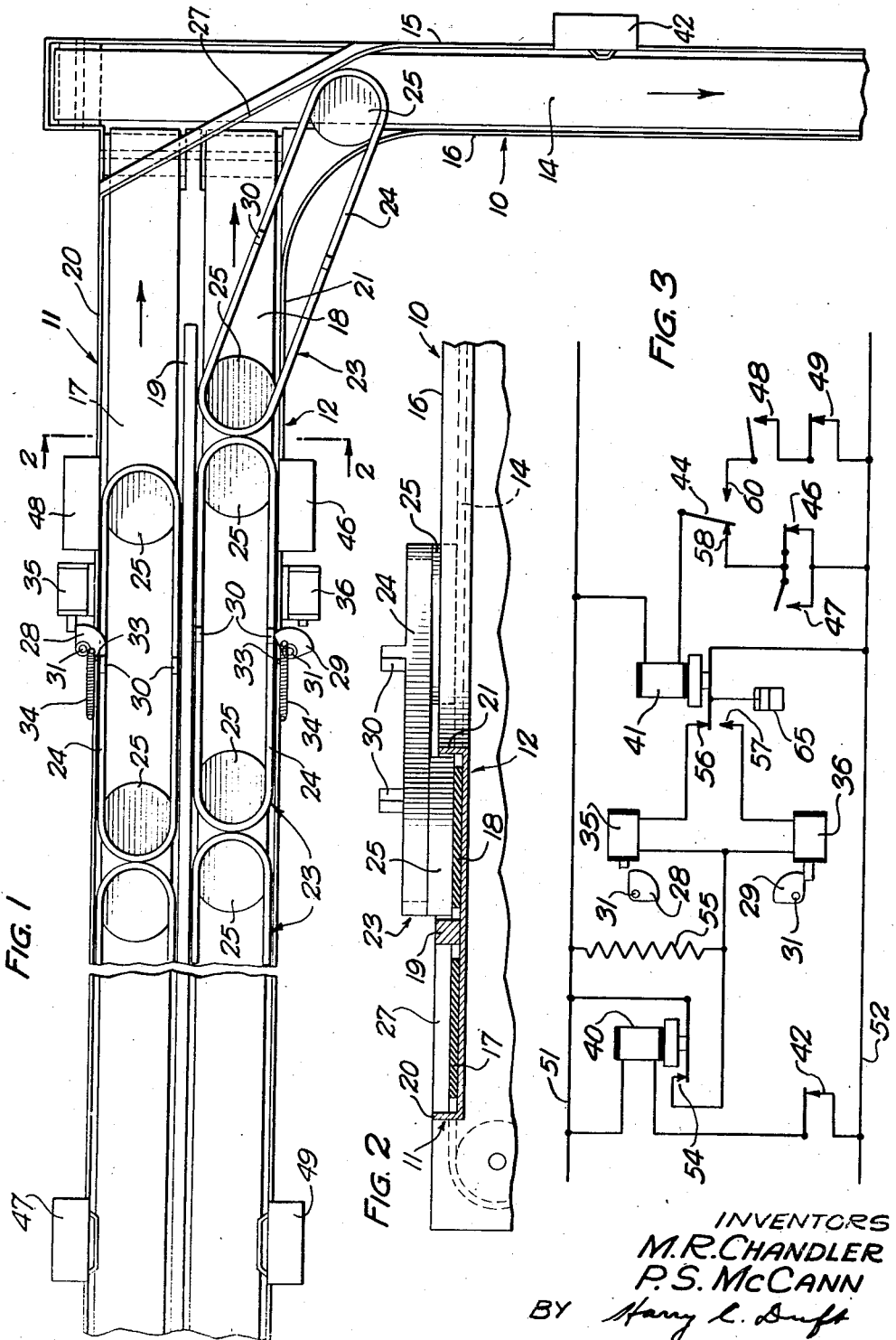
INVENTORS
M. R. CHANDLER
P. S. McCANN
BY Harry L. Duft
ATTORNEY Patented Sept. 12, 1944

2,357,875

UNITED STATES PATENT OFFICE 2,357,875

CONVEYER SYSTEM

Marshall R. Chandler, Downers Grove, and Paul S. McCann, La Grange, Ill., assignors to Western Electric Company, Incorporated, New York, N. Y., a corporation of New York Application April 28, 1942, Serial No. 440,816

5 Claims. (Cl. 198—79)

This invention relates to conveyer systems, and more particularly to a conveyer system in which a plurality of tributary conveyers are arranged to deliver articles to a single receiving conveyer.

Objects of the invention are to provide in a conveyer system of the type referred to, simple, inexpensive, and efficient mechanism for controlling the transfer of articles from the tributary conveyers to the receiving conveyer.

In accordance with one embodiment of the invention, there is provided a conveyer system in which two tributary conveyers are arranged to deliver articles to a single receiving conveyer. Mechanism is provided for controlling the movement of articles along the tributary conveyers, whereby the articles are delivered to the receiving conveyer from only one tributary conveyer at a time, and first from a selected one of the tributary conveyers until it is empty, except when the other tributary conveyer is filled with articles awaiting delivery to the main conveyer.

Other features and advantages of the invention will become apparent from the following detailed description when read in conjunction with the accompanying drawing, in which:

Fig. 1 is a fragmentary plan view, somewhat schematic, of a conveyer system embodying the invention;

Fig. 2 is an enlarged fragmentary section taken on line 2—2 of Fig. 1, and

Fig. 3 is a wiring diagram of the electrical control system.

The conveyer system illustrated in the drawing comprises a main conveyer 10 and two tributary conveyers 11 and 12 which are connected to the receiving end of the main conveyer and extend laterally therefrom. These conveyers may be of any well known type, those illustrated being of the endless belt type. The main conveyer comprises an endless belt 14 which is driven continuously between guide rails 15 and 16, and the tributary conveyers 11 and 12 comprise endless belts 17 and 18, respectively, which are driven continuously between a center guide rail 19 and outer guide rails 20 and 21, respectively. Suitable means (none shown) is provided for driving the several conveyer belts in the directions indicated by the arrows in Fig. 1.

The two tributary conveyers are adapted to convey articles, such as load carriers 23, 23, from separate receiving stations (not shown) to the main conveyer 10 which delivers the load carriers to the desired destination. The load carriers may be of any suitable construction. Those illustrated each comprises a rectangular hollow frame 24 which is provided at each end with a circular heel plate 25. These heel plates cooperate with the side guide rails of the conveyers to prevent lateral displacement of the load carriers on the conveyer belts. Also, the heel plates cooperate with a fixed deflector rail 27 to divert the carriers from the tributary conveyers onto the main conveyer, as shown in Figs. 1 and 2. It will be noted that the heel plates are of sufficient thickness to permit the carrier frames 24 to pass freely over the top edges of the conveyer guide rails, which permits the relatively long carriers to make sharp turns from the tributary conveyers onto the main conveyer.

Stop members 28 and 29 are provided near the discharge ends of tributary conveyers 11 and 12, respectively. These stop members are adapted to be engaged by upstanding lugs or projections 30, 30 on the load carriers, whereby the carriers may be stopped without stopping the tributary conveyer belts. Each of the stop members is pivotally mounted upon a vertical shaft 31 and is yieldably held in its operative position against a fixed pin 33 by a coil spring 34. Stop member 28 is normally locked in its operative position by the plunger of a solenoid 35, and stop member 29 is similarly locked in its operative position by a solenoid 36. When these solenoids are energized, their plungers are retracted and thereby rendered ineffective for preventing rotary movement of the stop members under the force of moving carriers on the continuously moving tributary conveyer belts. However, when the solenoids are de-energized, their plungers are projected into the path of the stop members, whereby the stop members are locked in their operative positions and thus cooperate with the lugs 30 on the carriers to stop the carriers from moving onto the main conveyer.

The energizing circuits of stop operating solenoids 35 and 36 are controlled by two relays 40 and 41 (Fig. 3). Relay 40 is controlled by a normally closed switch 42 which is mounted near the receiving end of the main conveyer and is adapted to be opened by the carriers as they travel along the main conveyer. By means of a selector switch 44 in the energizing circuit of relay 41, this relay may be placed under the control of either one or the other of two pairs of switches which are mounted along the tributary conveyers for operation by the moving carriers. One of these pairs of switches comprises a normally closed switch 46 and a normally open switch 47 connected in parallel with switch 46. Switch 46 is positioned near the discharge end of tributary conveyer 12 and is adapted to be opened by the frames 24 of carriers on conveyer belt 18 as they approach the main conveyer. Switch 47 is positioned near the receiving end of tributary conveyer 11 and is adapted to be closed by carriers on that conveyer. The other pair of switches comprises a normally open switch 48 and a normally closed switch 49 connected in series with switch 48. Switch 48 is positioned near the discharge end of tributary conveyer 11 and is adapted to be closed by the frames 24 of carriers on conveyer belt 17 as they approach the main conveyer. Switch 49 is positioned near the receiving end of tributary conveyer 12 and is adapted to be opened by carriers on that conveyer.

Electrical current for operating the above mentioned relays and solenoids is supplied by line wires 51 and 52 (Fig. 3) which are connected to a suitable electrical supply source (none shown). One end of the energizing winding of relay 40 is connected to line wire 51 and its opposite end is connected to line wire 52 through the normally closed switch 42. The energizing windings of stop solenoids 35 and 36 are connected at one end to line wire 51 through a normally closed contact 54 of relay 40 and also through a resistance 55. The opposite end of the energizing winding of stop solenoid 35 is connected to line wire 52 through a normally closed contact 56 of relay 41, and the opposite end of the energizing winding of stop solenoid 36 is adapted to be connected to line wire 52 through a normally open contact 57 of relay 41. The resistance 55 is of such a value that it transmits sufficient holding current for the stop solenoids, but does not transmit sufficient current for operating the solenoids.

In the operation of the above described conveyer system, the selector switch 44 is operated to close either one or the other of its contacts 58 and 60, according to which one of the two tributary conveyers is to receive preference over the other in delivering work carriers to the main conveyer. Assuming, for example, that tributary conveyer 12 is to receive preference over tributary conveyer 11, then the selector switch is positioned so as to close contact 58 and open contact 60, as shown in Fig. 3. Relay 41 is now under the control of normally closed switch 46 on tributary conveyer 12 and normally open switch 47 on tributary conveyer 11. Thus, as long as there are no work carriers on the conveyer belts opposite switches 42 and 46, relay 40 will be energized through normally closed switch 42 and relay 41 will be energized through normally closed switch 46. With both relays pulled up, as shown in Fig. 3, an energizing circuit for stop solenoid 35 is established through closed relay contacts 54 and 56, while the energizing circuit of stop solenoid 36 is open through relay contact 57. Therefore, stop member 29 on tributary conveyer 12 will be locked in its operative position by de-energized solenoid 36, while stop member 28 on tributary conveyer 11 will be released by energized solenoid 35. Although the momentary opening of switch 42 by carriers moving along the main conveyer may momentarily deenergize relay 40 and thereby momentarily open relay contact 54, stop solenoid 35, when energized, is maintained energized by holding current through resistance 55 until relay contact 56 is opened by de-energization of relay 41 through the opening of switch 46. Thus, until switch 46 is opened by a work carrier on tributary conveyer 12 approaching the main conveyer, stop 28 will be ineffective for stopping the delivery of work carriers from tributary conveyer 11 to main conveyer 10.

When a work carrier on tributary conveyer 12 approaches the main conveyer, its frame 24 opens switch 46 before its stop lug 30 engages stop member 29. The opening of switch 46, assuming that switch 47 is also open, de-energizes relay 41 so that its contact 56 is opened and its contact 57 is closed. This de-energizes stop solenoid 35 and energizes stop solenoid 36, whereby solenoid 35 locks stop member 28 in its operative position and solenoid 36 releases stop member 29. Thus, stop member 28 is now effective for stopping work carriers on tributary conveyer 11, while stop member 29 allows carriers on tributary conveyer 12 to be delivered to the main conveyer. This condition prevails until either switch 46 on conveyer 12 or switch 47 on conveyer 11 closes. Switch 46 closes only when there are no carriers opposite it on conveyer 12, and switch 47 is closed by carriers when positioned opposite it on conveyer 11. The closing of either switch 46 or switch 47 results in the energization of relay 41, which, in turn, de-energizes stop solenoid 36 and energizes stop solenoid 35, whereby stop member 29 is rendered effective for stopping carriers on conveyer 12 while stop member 28 on conveyer 11 is rendered ineffective so that carriers on this latter conveyer are now free to be delivered to the main conveyer. Thus, it will be apparent that by closing contact 58 of selector switch 44, tributary conveyer 12 is given preference over conveyer 11, that is, as long as there are carriers on conveyer 12 opposite switch 46 and the main conveyer is not completely filled, carriers will be delivered to the main conveyer by conveyer 12 only, unless switch 47 is held closed by a carrier on conveyer 11, in which case conveyer 11 only is permitted to deliver carriers to the main conveyer, but only until switch 47 opens again.

In order to give tributary conveyer 11 preference over conveyer 12, the selector switch 44 is operated so as to open contact 58 and close contact 60. Relay 41 is thus placed under the control of normally open switch 48 and normally closed switch 49. These two switches are connected in series so that both switches must be closed in order to complete the energizing circuit for relay 41. Switch 48 is arranged to be closed by carriers on conveyer 11 as they approach the main conveyer. Thus, the presence of a carrier near the discharge end of conveyer 11 results in the closing of switch 48, whereby relay 41 is energized, providing of course that switch 49 is also closed. The energization of relay 41 energizes stop solenoid 35 and de-energizes stop solenoid 36, whereby stop member 29 is rendered effective for stopping carriers on conveyer 12 and stop member 28 is rendered ineffective for stopping the delivery of carriers from conveyer 11 to the main conveyer. This condition will prevail until either switch 48 or switch 49 opens. Switch 48 will open only when there are no carriers opposite it on conveyer 11, and switch 49 will be opened only when a carrier is positioned opposite it on conveyer 12. The opening of either switch 48 or switch 49 de-energizes relay 41 which, in turn, de-energizes stop solenoid 35 and energizes stop solenoid 36, whereby carriers on conveyer 11 are stopped while carriers on conveyer 12 are released for delivery to the main conveyer. Thus, it will be apparent that by closing contact 60 of selector switch 44, tributary conveyer 11 is given preference over conveyer 12; that is, as long as there are carriers on conveyer 11 opposite switch 48 and the main conveyer is not completely filled, carriers will be delivered to the main conveyer by conveyer 11 only, unless switch 49 is held open by a carrier on conveyer 12, in which case conveyer 12 only is permitted to deliver carriers to the main conveyer, but only until switch 49 opens again.

Although the momentary opening of normally closed switch 42 by carriers moving along the main conveyer will momentarily de-energize relay 40 and thereby momentarily open relay contact 54, as mentioned above, stop solenoid 35, when energized, is maintained energized by holding current through resistance 55 until relay contact 56 is opened by de-energization of relay 41 through the opening of switch 48 or switch 49. Likewise, stop solenoid 36, when energized, is maintained energized by holding current through resistance 55 until relay contact 57 is opened by energization of relay 41 through the closing of both switches 48 and 49. In other words, the momentary opening of switch 42 by carriers moving along the main conveyer does not cause de-energization of the stop solenoids.

Whenever movement of the carriers on the main conveyer is interrupted, for example, when the main conveyer becomes completely filled with carriers, the last carrier on the main conveyer serves as a stop for interrupting the movement of carriers on that tributary conveyer which was delivering carriers to the main conveyer at the time it became filled. In such instances, the stop member on the other tributary conveyer cannot be released or rendered ineffective because the energization of the associated stop solenoid (35 or 36) is prevented due to the fact that switch 42 is held open by the stalled last carrier on the main conveyer. As pointed out above, resistance 55 does not transmit sufficient current to actuate the stop solenoids.

Relay 40 is of the retarded or slow operating type, so that a predetermined time interval is provided between the closing of switch 42 and the closing of relay contact 54. This time interval delays the release of carriers on either one of the tributary conveyers, and thereby prevents such carriers from colliding with previously released carriers on the other tributary conveyer.

Switches 47 and 49 are positioned near the receiving ends of the tributary conveyers and are operated by the frames 24 of the carriers. As hereinbefore described, these switches together with switches 46 and 48 control relay 41 which, in turn, controls stop solenoids 35 and 36. Relay 41 is of the retarded or slow operating type and, therefore, it is not affected by the momentary operation of the aforementioned control switches by passing carriers. In other words, the operation of relay 41 to shift the delivery of carriers from one tributary conveyer to the other requires that control switch 47 or control switch 49 be held in its operated position a predetermined length of time by a carrier whose movement has been interrupted because the conveyer upon which it is placed is completely filled with stalled carriers.

Any suitable means, such as a double dash pot 65 (Fig. 3), may be provided on relay 41 to retard the closing of contacts 56 and 57 and thus delay the release of carriers on either one of the tributary conveyers for a sufficient length of time to avoid their collision with previously released carriers on the other tributary conveyer.

It is to be understood that the invention is not limited to the specific embodiments thereof herein illustrated and described, but is capable of other applications within the scope of the appended claims.

What is claimed is:

1. A conveyer system comprising a receiving conveyer, a plurality of tributary conveyers, means responsive to articles on the conveyers for causing delivery from one of said tributary conveyers to said receiving conveyer until a predetermined number of articles are accumulated on a second tributary conveyer, and means responsive to articles on the conveyers for then stopping delivery of articles from said first tributary conveyer and causing delivery from said second tributary conveyer until the number of articles on said second tributary conveyer has been reduced below a predetermined amount.

2. A conveyer system comprising a receiving conveyer, a plurality of tributary conveyers, means responsive to articles on a first tributary conveyer for causing the first tributary conveyer to deliver articles to the receiving conveyer, means responsive to articles on the first tributary conveyer and on a second tributary conveyer for causing the second tributary conveyer to deliver articles to the receiving conveyer when the articles on said first conveyer become exhausted, and means responsive to articles on the first tributary conveyer for causing said first tributary conveyer to resume delivery of articles when it is again supplied with articles.

3. A conveyer system comprising a receiving conveyer, a plurality of tributary conveyers, means responsive to articles on a first tributary conveyer for causing the first tributary conveyer to deliver articles to the receiving conveyer, means responsive to articles on the first tributary conveyer and on a second tributary conveyer for causing the second tributary conveyer to deliver articles to the receiving conveyer when the articles on said first conveyer become exhausted, means responsive to articles on said first tributary conveyer for causing said first tributary conveyer to resume delivery of articles when it is again supplied with articles, and means responsive to articles on the second tributary conveyer for preventing said first tributary conveyer from resuming delivery of articles when said second conveyer is supplied with a predetermined large number of articles.

4. A conveyer system comprising a receiving conveyer, a plurality of tributary conveyers for delivering articles to said receiving conveyer, means responsive to articles on one of said tributary conveyers for giving preference to said one of said tributary conveyers in delivering articles to the receiving conveyer, means responsive to articles on one of said tributary conveyers for shifting preference to another of said tributary conveyers in response to predetermined conditions, and means settable for selecting any one of said tributary conveyers for preferred delivery while another tributary conveyer is rendered effective to assume delivery under control of articles on the two tributary conveyers.

5. A conveyer system comprising a receiving conveyer, a plurality of tributary conveyers for delivering articles to said receiving conveyer, a releasable stop on each of said tributary conveyers for stopping the delivery of articles therefrom, an electromagnetic releasing means for each of said stops, a switch settable for causing the operation of one of said releasing means to give preference to one of said tributary conveyers in delivering articles to said receiving conveyer, a switch operable by articles on a second tributary conveyer for shifting preference thereto under predetermined conditions, a second switch actuated by articles moving along said receiving conveyer for preventing the shifting of preference while said control means is engaged by a moving article, and means for rendering said control means ineffective for de-energizing said electromagnetic stop releasing means.

MARSHALL R. CHANDLER.
PAUL S. McCANN.